United States Patent
Bucknell et al.

(10) Patent No.: US 12,249,812 B2
(45) Date of Patent: Mar. 11, 2025

(54) BUS BARS FOR PRINTED STRUCTURAL ELECTRIC BATTERY MODULES

(71) Applicant: DIVERGENT TECHNOLOGIES, INC., Los Angeles, CA (US)

(72) Inventors: John Russell Bucknell, El Segundo, CA (US); Antonio Bernerd Martinez, El Segundo, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 319 days.

(21) Appl. No.: 17/578,357

(22) Filed: Jan. 18, 2022

(65) Prior Publication Data

US 2022/0231486 A1 Jul. 21, 2022

Related U.S. Application Data

(60) Provisional application No. 63/139,295, filed on Jan. 19, 2021.

(51) Int. Cl.
| | |
|---|---|
| *H02B 1/20* | (2006.01) |
| *B33Y 10/00* | (2015.01) |
| *B33Y 80/00* | (2015.01) |
| *H01M 50/505* | (2021.01) |

(52) U.S. Cl.
CPC ............ *H02B 1/20* (2013.01); *B33Y 10/00* (2014.12); *B33Y 80/00* (2014.12); *H01M 50/505* (2021.01)

(58) Field of Classification Search
CPC ....................................................... H02B 1/20
USPC ............................................................ 174/6
See application file for complete search history.

(56) References Cited

U.S. PATENT DOCUMENTS

| | | | |
|---|---|---|---|
| 5,203,226 A | | 4/1993 | Hongou et al. |
| 5,225,061 A | * | 7/1993 | Westerlund ............. C25B 11/02 |
| | | | 204/255 |
| 5,742,385 A | | 4/1998 | Champa |
| 5,990,444 A | | 11/1999 | Costin |
| 6,010,155 A | | 1/2000 | Rinehart |
| 6,096,249 A | | 8/2000 | Yamaguchi |
| 6,140,602 A | | 10/2000 | Costin |

(Continued)

FOREIGN PATENT DOCUMENTS

| | | |
|---|---|---|
| GB | 2568868 B | 2/2021 |
| WO | 1996036455 A1 | 11/1996 |

(Continued)

OTHER PUBLICATIONS

US 9,202,136 B2, 12/2015, Schmidt et al. (withdrawn)

(Continued)

*Primary Examiner* — Stanley Tso
(74) *Attorney, Agent, or Firm* — ARENTFOX SCHIFF LLP

(57) ABSTRACT

Techniques for co-printing of bus bars for printed structural energy modules are presented herein. An apparatus in accordance with an aspect of the present disclosure comprises a first component configured to be a primary structure of a vehicle, the first component co-printed with a first electrical conductive path, the first electrical conductive path configured to be connected to a second electrical conductive path of a second component of the vehicle, wherein the first electrical conductive path and the second electrical conductive path are configured to enable electricity transmission.

18 Claims, 15 Drawing Sheets

(56) References Cited

U.S. PATENT DOCUMENTS

| | | |
|---|---|---|
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |

(56) References Cited

U.S. PATENT DOCUMENTS

| | | |
|---|---|---|
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |

(56) References Cited

U.S. PATENT DOCUMENTS

| | | | |
|---|---|---|---|
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2006/0108783 A1 | 5/2006 | Ni et al. | |
| 2010/0133030 A1 | 6/2010 | Johnson et al. | |
| 2011/0042916 A1 | 2/2011 | Ananthakrishna | |
| 2011/0294007 A1* | 12/2011 | Hosaka | H01M 50/423 29/623.2 |
| 2013/0306369 A1* | 11/2013 | Li | H02B 1/205 174/71 B |
| 2014/0277669 A1 | 9/2014 | Nardi et al. | |
| 2017/0113344 A1 | 4/2017 | Schönberg | |
| 2017/0341309 A1 | 11/2017 | Piepenbrock et al. | |
| 2019/0280471 A1* | 9/2019 | Schell | H02G 5/025 |
| 2019/0374867 A1* | 12/2019 | Koker | A63H 18/10 |

FOREIGN PATENT DOCUMENTS

| | | | |
|---|---|---|---|
| WO | 1996036525 A1 | 11/1996 | |
| WO | 1996038260 A1 | 12/1996 | |
| WO | 2001089916 A1 | 11/2001 | |
| WO | 2003024641 A1 | 3/2003 | |
| WO | 2004108343 A1 | 12/2004 | |
| WO | 2005093773 A1 | 10/2005 | |
| WO | 2007003375 A1 | 1/2007 | |
| WO | 2007110235 A1 | 10/2007 | |
| WO | 2007110236 A1 | 10/2007 | |
| WO | 2008019847 A1 | 2/2008 | |
| WO | 2007128586 A3 | 6/2008 | |
| WO | 2008068314 A2 | 6/2008 | |
| WO | 2008086994 A1 | 7/2008 | |
| WO | 2008087024 A1 | 7/2008 | |
| WO | 2008107130 A1 | 9/2008 | |
| WO | 2008138503 A1 | 11/2008 | |
| WO | 2008145396 A1 | 12/2008 | |
| WO | 2009083609 A2 | 7/2009 | |
| WO | 2009098285 A1 | 8/2009 | |
| WO | 2009112520 A1 | 9/2009 | |
| WO | 2009135938 A1 | 11/2009 | |
| WO | 2009140977 A1 | 11/2009 | |
| WO | 2010125057 A2 | 11/2010 | |
| WO | 2010125058 A1 | 11/2010 | |
| WO | 2010142703 A2 | 12/2010 | |
| WO | 2011032533 A1 | 3/2011 | |
| WO | 2012104592 A1 | 8/2012 | |
| WO | 2014016437 A1 | 1/2014 | |
| WO | 2014187720 A1 | 11/2014 | |
| WO | 2014195340 A1 | 12/2014 | |
| WO | 2015193331 A1 | 12/2015 | |
| WO | 2016116414 A1 | 7/2016 | |
| WO | 2017036461 A1 | 3/2017 | |
| WO | WO2020/154330 * | 1/2019 | ............ H01R 4/48 |
| WO | 2019030248 A1 | 2/2019 | |
| WO | 2019042504 A1 | 3/2019 | |
| WO | 2019048010 A1 | 3/2019 | |
| WO | 2019048498 A1 | 3/2019 | |
| WO | 2019048680 A1 | 3/2019 | |
| WO | 2019048682 A1 | 3/2019 | |
| WO | 2020/154330 A1 | 7/2020 | |

OTHER PUBLICATIONS

US 9,809,265 B2, 11/2017, Kinjo (withdrawn)
US 10,449,880 B2, 10/2019, Mizobata et al. (withdrawn)
International Search Report and the Written Opinion issued for corresponding International Application No. PCT/US22/13008, May 3, 2022.

* cited by examiner

1000

1002

Additively manufacture a first component configured to be a primary structure of a vehicle, where the first component is co-printed with a first electrical conductive path, the first electrical conductive path configured to be connected to a second electrical conductive path of a second component of the vehicle, where the first electrical conductive path and the second electrical conductive path are configured to enable electricity transmission

1004

Inject an electrical insulator between the first conductive path and the first component

FIG. 10

BUS BARS FOR PRINTED STRUCTURAL ELECTRIC BATTERY MODULES

CROSS REFERENCE TO RELATED APPLICATION(S)

This application claims the benefit of U.S. Provisional Application Ser. No. 63/139,295, entitled "BUS BARS FOR PRINTED STRUCTURAL CELLULAR ELECTRIC BATTERY MODULES" and filed on Jan. 19, 2021, the disclosure of which is expressly incorporated by reference herein in its entirety.

BACKGROUND

Field

The present disclosure relates generally to techniques for co-printing bus bars for printed structural energy storage modules using additively manufactured parts and techniques.

Background

Three-dimensional (3-D) printing, also referred to as additive manufacturing (AM), presents new opportunities to more efficiently build structures, such as automobiles, aircraft, boats, motorcycles, busses, trains and the like. Applying AM processes to industries that produce these products has proven to produce a structurally more efficient transport structure. For example, an automobile produced using 3-D printed components can be made stronger, lighter, and consequently, more fuel efficient. Moreover, AM enables manufacturers to 3-D print parts that are much more complex and that are equipped with more advanced features and capabilities than parts made via traditional machining and casting techniques.

Despite these recent advances, a number of obstacles remain with respect to the practical implementation of AM techniques in transport structures and other mechanized assemblies. For instance, regardless of whether AM is used to produce various components of such devices, manufacturers typically rely on labor-intensive and expensive techniques such as welding, riveting, etc., to join components together, such as nodes used in a transport structure. The deficiencies associated with welding and similar techniques are equally applicable to components, such as a vehicle gear case, that are currently too large to 3-D print in a single AM step. A given 3-D printer is usually limited to rendering objects having a finite size, often dictated by the available surface area of the 3-D printer's build plate and the allowable volume the printer can accommodate. In these instances, manufacturers are often relegated to building the component using the traditional, expensive and time-consuming machining techniques. Alternatively, manufacturers may 3-D print a number of subcomponents and combine them to form a complete, functional component or assembly.

Thus, the current manufacturing techniques are unable to manufacture primary structures of high complexity and varied shapes such that they can enable for an optimized load sharing throughout a vehicle and fail to resolve the problem of vehicles with large mass.

SUMMARY

Several aspects and techniques for co-printing bus bars for printed structural energy storage modules will be described more fully hereinafter with reference to three-dimensional (3-D) printing techniques.

An apparatus in accordance with an aspect of the present disclosure comprises a first component configured to be a primary structure of a vehicle, the first component co-printed with a first electrical conductive path, the first electrical conductive path configured to be connected to a second electrical conductive path of a second component of the vehicle, wherein the first electrical conductive path and the second electrical conductive are configured to enable electricity transmission.

In certain aspects, the first component of such an apparatus comprises at least a tongue structure configured to mate with a corresponding groove structure of the second component, wherein the first electrical conductive path passes through a portion of the tongue structure of the first component. In certain aspects, the first component comprise a groove structure configured to mate with a corresponding tongue structure of the second component wherein the second electrical conductive path passes through a portion of the tongue structure of the second component.

In certain aspects, the first component of such an apparatus is co-printed with a first set of supports, each support of the first set of supports is connected to a portion of the first electrical conductive path.

In certain aspects, the first component of such an apparatus is configured to receive at least a portion of a first energy storage module. In certain aspects, the first electrical conductive path is configured to be connected to the first energy storage module.

In certain aspects, such an apparatus further optionally includes an electrical insulator between the first conductive path and the first component. In certain aspects, the first electrical conductive path comprises a bus bar.

It will be understood that other aspects of co-printing bus bars for printed structural energy storage modules will become readily apparent to those skilled in the art from the following detailed description, wherein it is shown and described only several embodiments by way of illustration. As will be appreciated by those skilled in the art, the co-printing bus bars for printed structural energy storage modules can be realized with other embodiments without departing from the invention. Accordingly, the drawings and detailed description are to be regarded as illustrative in nature and not as restrictive.

BRIEF DESCRIPTION OF THE DRAWINGS

Various aspects of apparatuses and methods for co-printing bus bars for printed structural energy storage modules will now be presented in the detailed description by way of example, and not by way of limitation, in the accompanying drawings, wherein:

FIG. 10 is a flowchart illustrating an example method in accordance with various aspects of the present disclosure.

DETAILED DESCRIPTION

Figure 1A:
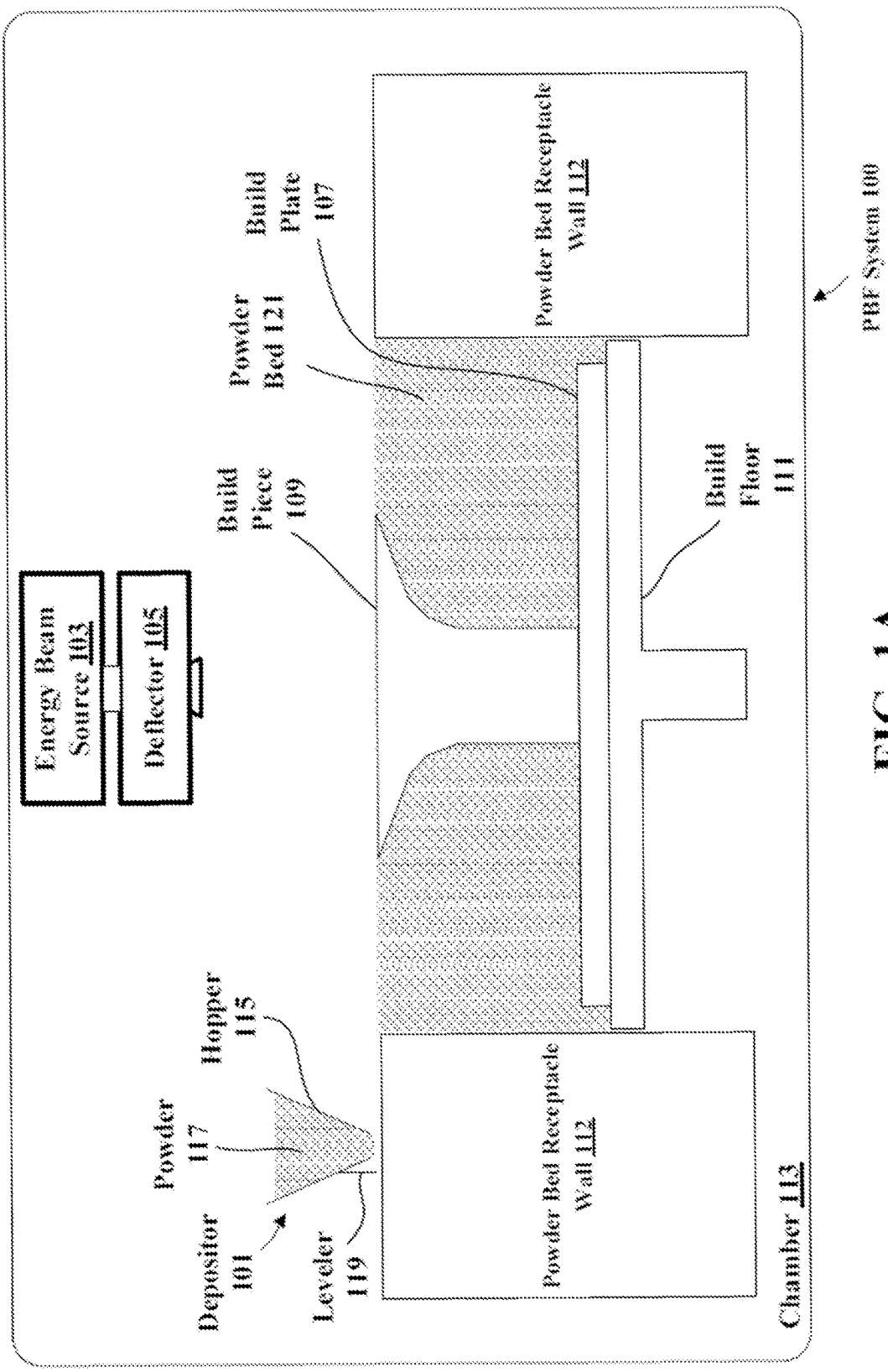
FIGS. 1A-1D illustrate respective side views of a 3-D printer system, in accordance with various aspects of the present disclosure.

The detailed description set forth below in connection with the drawings is intended to provide a description of exemplary embodiments of co-printing bus bars for printed structural energy storage modules, and it is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

As described above, energy storage modules, for example, batteries, used in vehicles, and particularly, in electrical vehicles account for a large amount of total mass. The present disclosure is generally directed to techniques for additive manufacturing that allows for energy storage modules to be integrated into primary structures. The primary structures may be formed by joining nodes as described herein. For example, the primary structures and/or nodes may be additively manufactured and/or configured to receive the energy storage modules. While configuring the primary structures to receive energy storage modules may reduce mass of the vehicle, however the total mass of the vehicle may not be fully optimized unless the electrical conductive paths connecting the energy storage modules to other electrical components of the vehicle are also manufactured in a manner without requiring additional support structures to hold the electrical conductive path. Accordingly, the present disclosure is also directed to techniques for using additive manufacturing to co-print a primary structure and/or a portion of the primary with a bus bar.

The techniques described in the present disclosure allow for the bus bars to be co-printed in various shapes such that the bus bars can successfully connect individual energy storage modules in different primary structures. The techniques described in the present disclosure allow for the bus bars to connect and/or couple individual energy storage modules into a pack through various series and/or parallel connections with the energy storage modules. Thus, the techniques described in the present disclosure allow for a desired level of system voltage to be retained while reducing and spreading the mass of the vehicle more evenly throughout a vehicle.

The use of additive manufacturing in the context of joining two or more parts provides significant flexibility and cost saving benefits that enable manufacturers of mechanical structures and mechanized assemblies to manufacture parts with complex geometries at a lower cost to the consumer. The joining techniques described in the foregoing relate to a process for connecting AM parts and/or commercial off the shelf (COTS) components. AM parts are printed three-dimensional (3-D) parts that are printed by adding layer upon layer of a material based on a preprogramed design. The parts described in the foregoing may be parts used to assemble a transport structure such as an automobile. However, those skilled in the art will appreciate that the manufactured parts may be used to assemble other complex mechanical products such as vehicles, trucks, trains, motorcycles, boats, aircraft, and the like, and other mechanized assemblies, without departing from the scope of the invention.

A node is an example of an AM part. A node may be any 3-D printed part that includes a socket or other mechanism (e.g., a feature to accept these parts) for accepting a component such as a tube and/or a panel. The node may have internal features configured to accept a particular type of component. Alternatively or conjunctively, the node may be shaped to accept a particular type of component. A node, in some embodiments of this disclosure may have internal features for positioning a component in the node's socket. However, as a person having ordinary skill in the art will appreciate, a node may utilize any feature comprising a variety of geometries to accept any variety of components without departing from the scope of the disclosure. For example, certain nodes may include simple insets, grooves or indentations for accepting other structures, which may be further bound via adhesives, fasteners or other mechanisms.

Nodes as described herein may further include structures for joining tubes, panels, and other components for use in a transport structure or other mechanical assembly. For example, nodes may include joints that may act as an intersecting points for two or more panels, connecting tubes, or other structures. To this end, the nodes may be configured with apertures or insets configured to receive such other structures such that the structures are fit securely at the node. Nodes may join connecting tubes to form a space frame vehicle chassis. Nodes may also be used to join internal or external panels and other structures. In many cases, individual nodes may need to be joined together to accomplish their intended objectives in enabling construction of the above described structures. Various such joining techniques are described below.

FIGS. 1A-D illustrate respective side views of an exemplary 3-D printer system.

In this example, the 3-D printer system is a powder-bed fusion (PBF) system 100. FIGS. 1A-D show PBF system 100 during different stages of operation. The particular embodiment illustrated in FIGS. 1A-D is one of many suitable examples of a PBF system employing principles of this disclosure. It should also be noted that elements of FIGS. 1A-D and the other figures in this disclosure are not necessarily drawn to scale, but may be drawn larger or smaller for the purpose of better illustration of concepts described herein. PBF system 100 can include a depositor 101 that can deposit each layer of metal powder, an energy beam source 103 that can generate an energy beam, a deflector 105 that can apply the energy beam to fuse the powder material, and a build plate 107 that can support one or more build pieces, such as a build piece 109. Although the terms "fuse" and/or "fusing" are used to describe the mechanical coupling of the powder particles, other mechanical actions, e.g., sintering, melting, and/or other electrical, mechanical, electromechanical, electrochemical, and/or chemical coupling methods are envisioned as being within the scope of the present disclosure.

PBF system 100 can also include a build floor 111 positioned within a powder bed receptacle. The walls of the powder bed receptacle 112 generally define the boundaries of the powder bed receptacle, which is sandwiched between the walls 112 from the side and abuts a portion of the build floor 111 below. Build floor 111 can progressively lower build plate 107 so that depositor 101 can deposit a next layer. The entire mechanism may reside in a chamber 113 that can enclose the other components, thereby protecting the equipment, enabling atmospheric and temperature regulation and mitigating contamination risks. Depositor 101 can include a hopper 115 that contains a powder 117, such as a metal powder, and a leveler 119 that can level the top of each layer of deposited powder.

Referring specifically to FIG. 1A, this figure shows PBF system 100 after a slice of build piece 109 has been fused, but before the next layer of powder has been deposited. In fact, FIG. 1A illustrates a time at which PBF system 100 has already deposited and fused slices in multiple layers, e.g., 150 layers, to form the current state of build piece 109, e.g., formed of 150 slices. The multiple layers already deposited have created a powder bed 121, which includes powder that was deposited but not fused.

Figure 1B:
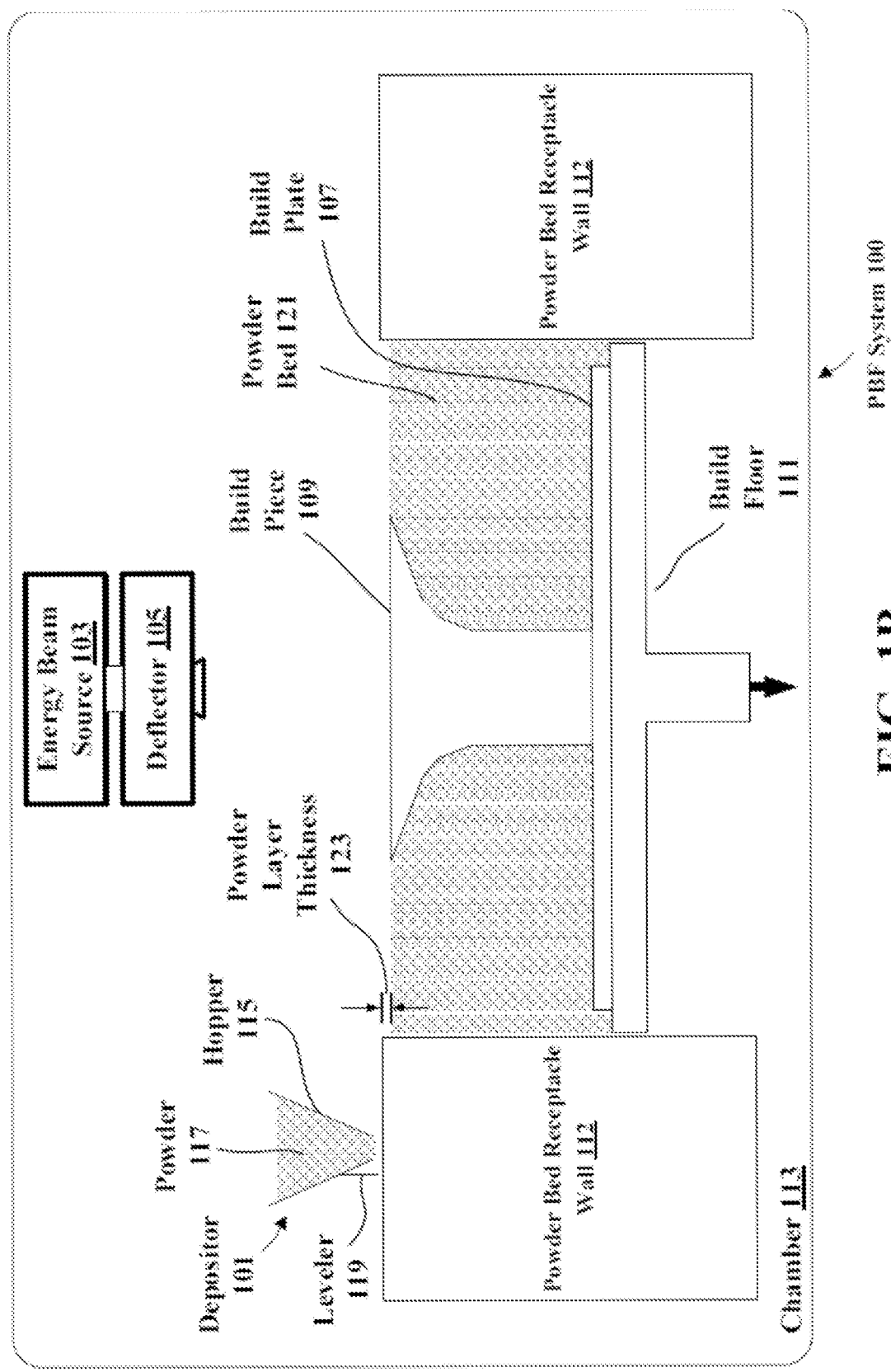

FIG. 1B shows PBF system 100 at a stage in which build floor 111 can lower by a powder layer thickness 123. The lowering of build floor 111 causes build piece 109 and powder bed 121 to drop by powder layer thickness 123, so that the top of the build piece and powder bed are lower than the top of powder bed receptacle wall 112 by an amount equal to the powder layer thickness. In this way, for example, a space with a consistent thickness equal to powder layer thickness 123 can be created over the tops of build piece 109 and powder bed 121.

Figure 1C:
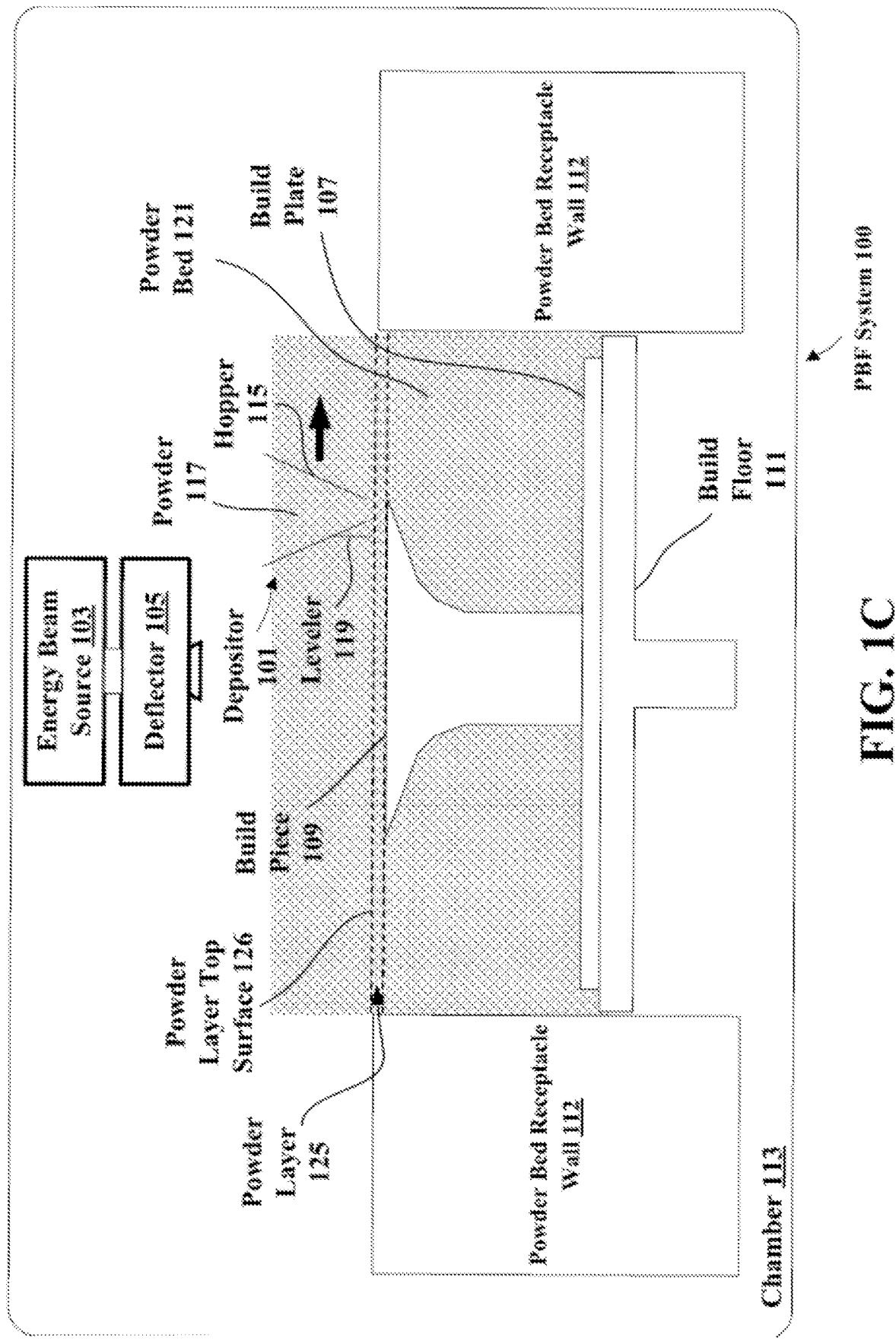

FIG. 1C shows PBF system 100 at a stage in which depositor 101 is positioned to deposit powder 117 in a space created over the top surfaces of build piece 109 and powder bed 121 and bounded by powder bed receptacle walls 112. In this example, depositor 101 progressively moves over the defined space while releasing powder 117 from hopper 115. Leveler 119 can level the released powder to form a powder layer 125 that has a thickness substantially equal to the powder layer thickness 123 (see FIG. 1B). Thus, the powder in a PBF system can be supported by a powder material support structure, which can include, for example, a build plate 107, a build floor 111, a build piece 109, walls 112, and the like. It should be noted that the illustrated thickness of powder layer 125 (i.e., powder layer thickness 123 (FIG. 1B)) is greater than an actual thickness used for the example involving 150 previously-deposited layers discussed above with reference to FIG. 1A.

Figure 1D:
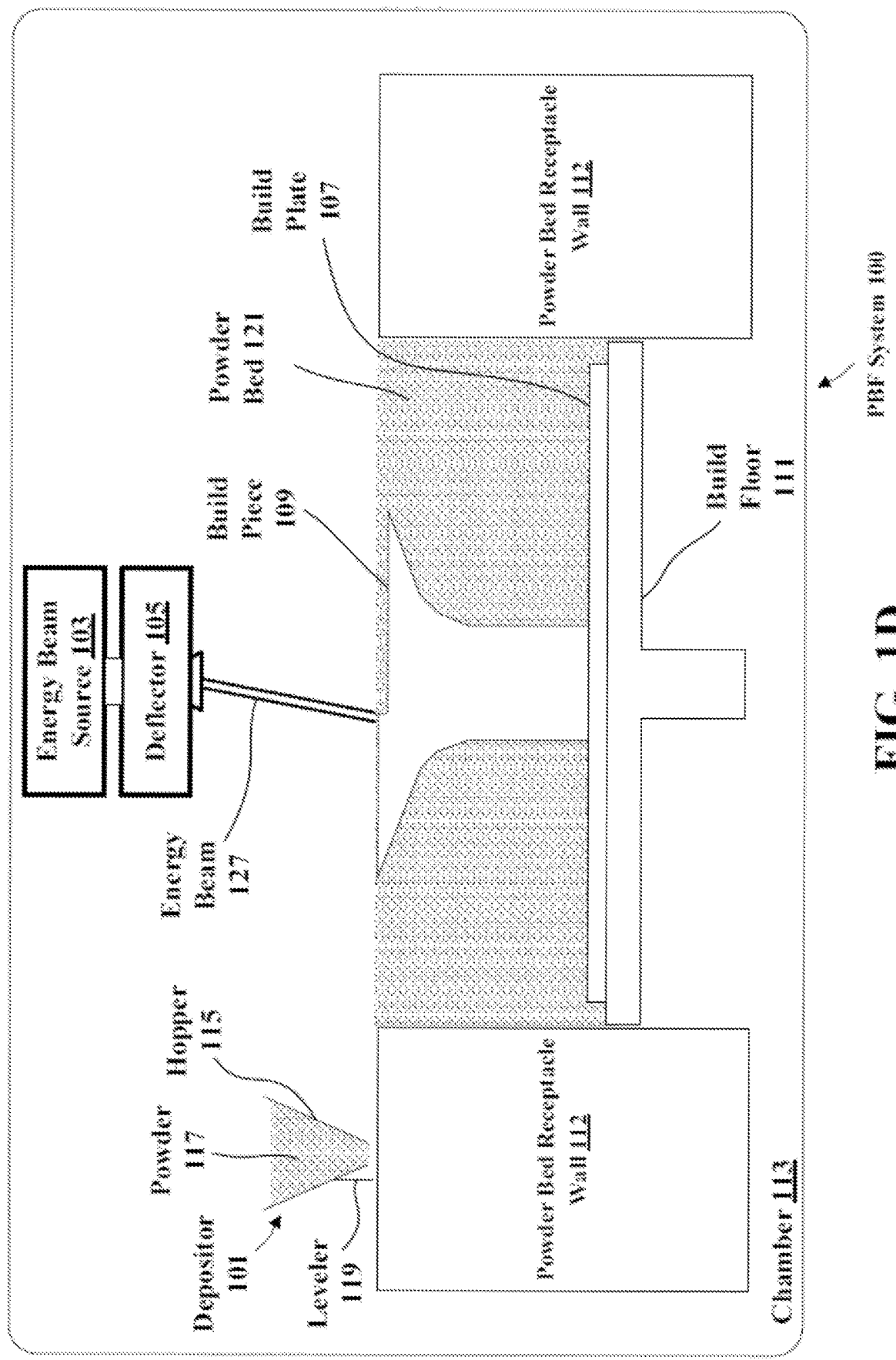

FIG. 1D shows PBF system 100 at a stage in which, following the deposition of powder layer 125 (FIG. 1C), energy beam source 103 generates an energy beam 127 and deflector 105 applies the energy beam to fuse the next slice in build piece 109. In various exemplary embodiments, energy beam source 103 can be an electron beam source, in which case energy beam 127 constitutes an electron beam. Deflector 105 can include deflection plates that can generate an electric field or a magnetic field that selectively deflects the electron beam to cause the electron beam to scan across areas designated to be fused. In various embodiments, energy beam source 103 can be a laser, in which case energy beam 127 is a laser beam. Deflector 105 can include an optical system that uses reflection and/or refraction to manipulate the laser beam to scan selected areas to be fused.

In various embodiments, the deflector 105 can include one or more gimbals and actuators that can rotate and/or translate the energy beam source to position the energy beam. In various embodiments, energy beam source 103 and/or deflector 105 can modulate the energy beam, e.g., turn the energy beam on and off as the deflector scans so that the energy beam is applied only in the appropriate areas of the powder layer. For example, in various embodiments, the energy beam can be modulated by a digital signal processor (DSP).

Figure 1E:
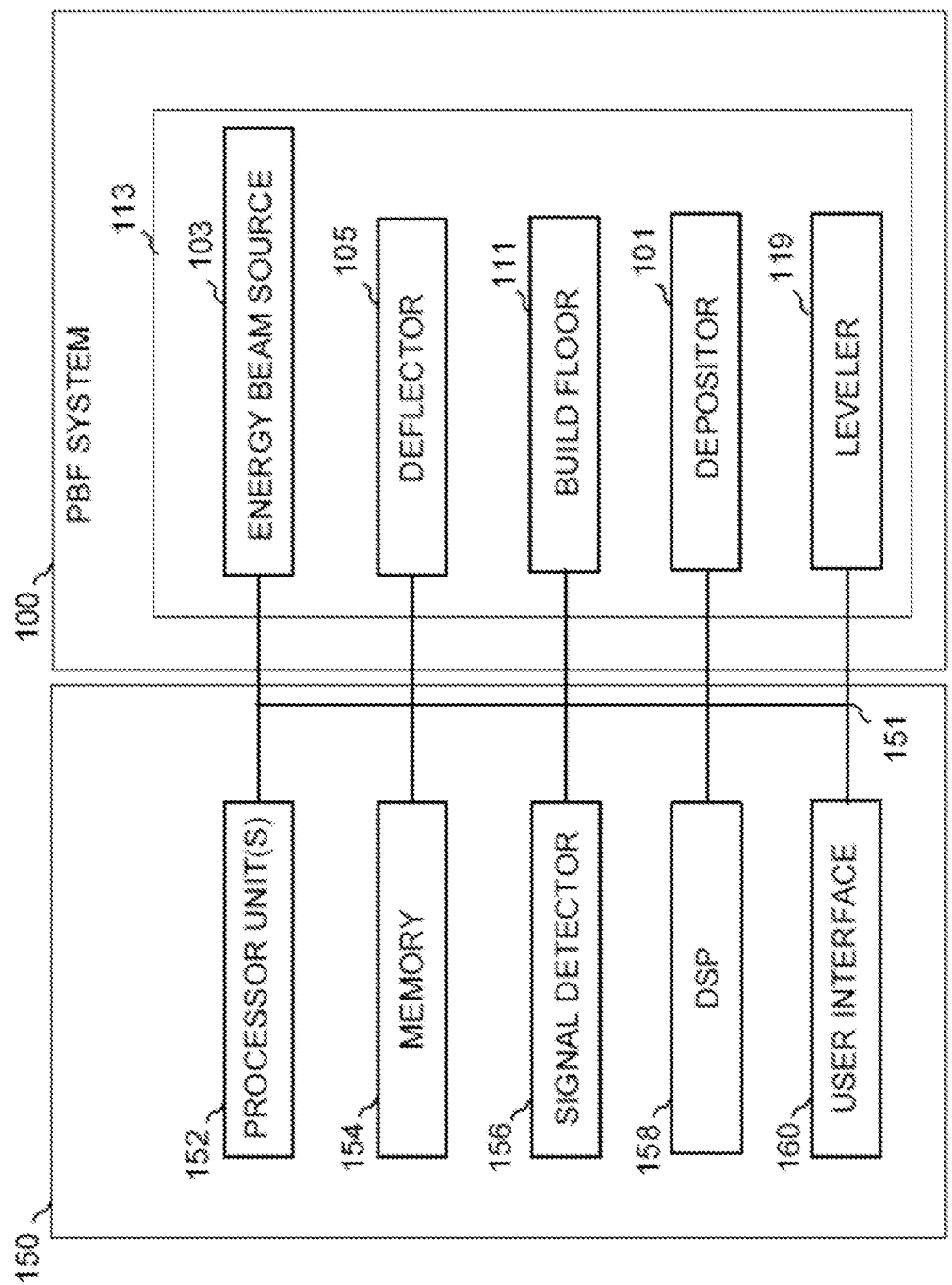
FIG. 1E illustrates a functional block diagram of a 3-D printer system, in accordance with various aspects of the present disclosure.

FIG. 1E illustrates a functional block diagram of a 3-D printer system in accordance with an aspect of the present disclosure.

In an aspect of the present disclosure, control devices and/or elements, including computer software, may be coupled to PDF system 100 to control one or more components within PDF system 100. Such a device may be a computer 150, which may include one or more components that may assist in the control of PDF system 100. Computer 150 may communicate with a PDF system 100, and/or other AM systems, via one or more interfaces 151. The computer 150 and/or interface 151 are examples of devices that may be configured to implement the various methods described herein, that may assist in controlling PDF system 100 and/or other AM systems.

In an aspect of the present disclosure, computer 150 may comprise at least one processor unit 152, memory 154, signal detector 156, a digital signal processor (DSP) 158, and one or more user interfaces 160. Computer 150 may include additional components without departing from the scope of the present disclosure.

The computer 150 may include at least one processor unit 152, which may assist in the control and/or operation of PDF system 100. The processor unit 152 may also be referred to as a central processing unit (CPU). Memory 154, which may include both read-only memory (ROM) and random access memory (RAM), may provide instructions and/or data to the processor 504. A portion of the memory 154 may also include non-volatile random access memory (NVRAM). The processor 152 typically performs logical and arithmetic operations based on program instructions stored within the memory 154. The instructions in the memory 154 may be executable (by the processor unit 152, for example) to implement the methods described herein.

The processor unit 152 may comprise or be a component of a processing system implemented with one or more processors. The one or more processors may be implemented with any combination of general-purpose microprocessors, microcontrollers, digital signal processors (DSPs), floating point gate arrays (FPGAs), programmable logic devices (PLDs), controllers, state machines, gated logic, discrete hardware components, dedicated hardware finite state machines, or any other suitable entities that can perform calculations or other manipulations of information.

The processor unit 152 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, RS-274 instructions (G-code), numerical control (NC) programming language, and/or any other suitable format of code). The instructions, when executed by the one or more processors, cause the processing system to perform the various functions described herein.

The computer 150 may also include a signal detector 156 that may be used to detect and quantify any level of signals received by the computer 150 for use by the processing unit 152 and/or other components of the computer 150. The signal detector 156 may detect such signals as energy beam source 103 power, deflector 105 position, build floor 111 height, amount of powder 117 remaining in depositor 101, leveler 119 position, and other signals. The computer 150 may also include a DSP 158 for use in processing signals received by the computer 150. The DSP 158 may be configured to generate instructions and/or packets of instructions for transmission to PDF system 100.

The computer 150 may further comprise a user interface 160 in some aspects. The user interface 160 may comprise a keypad, a pointing device, and/or a display. The user interface 160 may include any element or component that conveys information to a user of the computer 150 and/or receives input from the user.

The various components of the computer 150 may be coupled together by a bus system 151. The bus system 151 may include a data bus, for example, as well as a power bus, a control signal bus, and a status signal bus in addition to the data bus. Components of the computer 150 may be coupled together or accept or provide inputs to each other using some other mechanism.

Although a number of separate components are illustrated in FIG. 1E, one or more of the components may be combined or commonly implemented. For example, the processor unit 152 may be used to implement not only the functionality described above with respect to the processor unit 152, but also to implement the functionality described above with respect to the signal detector 156, the DSP 158, and/or the user interface 160. Further, each of the components illustrated in FIG. 1E may be implemented using a plurality of separate elements.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disc (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises a non-transitory computer readable medium (e.g., tangible media).

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Figure 2:
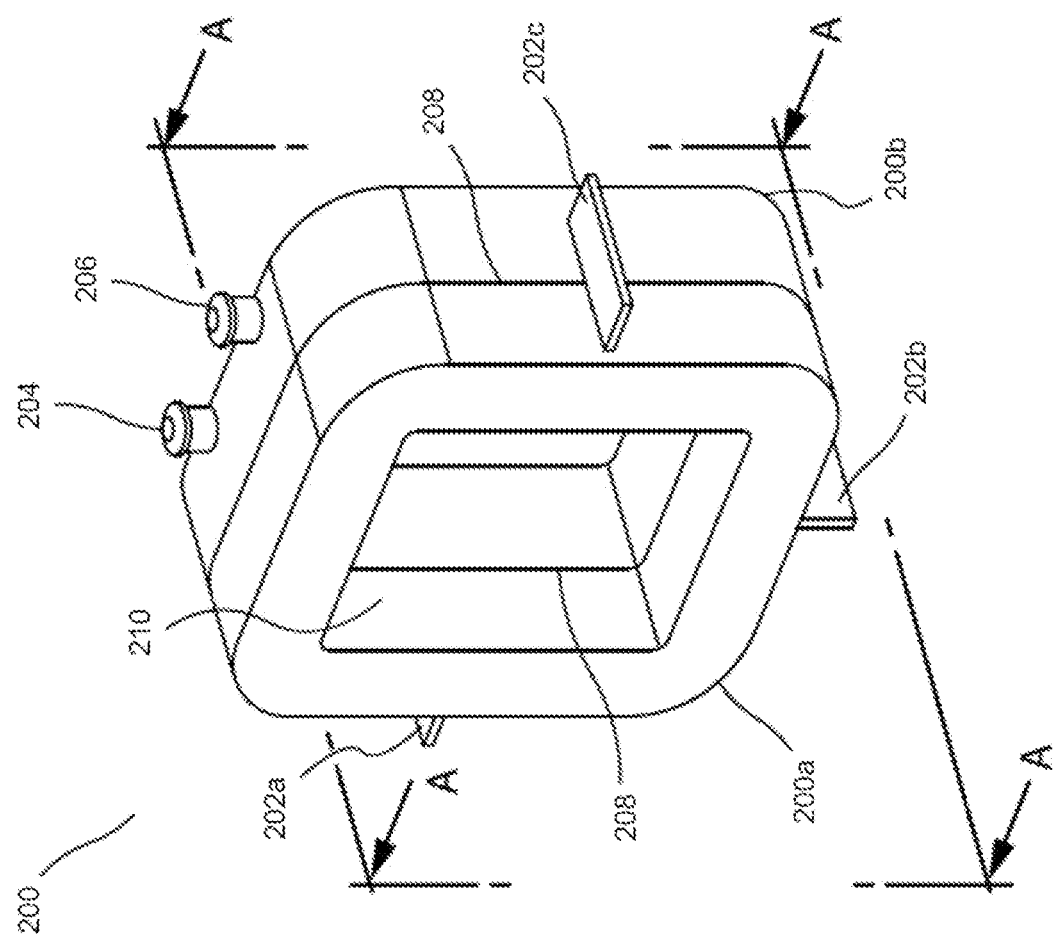
FIG. 2 shows a perspective view illustrating an additively manufactured node-node joint, in accordance with various aspects of the present disclosure.

FIG. 2 shows a perspective view illustrating an additively manufactured node-node joint.

In an embodiment, a tongue-and-groove structure is used to connect two or more nodes. FIG. 2 illustrates a perspective view of an additively manufactured node-node joint 200. More specifically, node-node joint sections 200a and 200b are shown joined together at gap 208. In some embodiments, node-node joint 200 may further include standoff tabs 202a-202c arranged around the perimeter of node-node joint 200. In an exemplary embodiment, gap 208 is a 0.25 mm gap (or a gap of another dimension) configured to enable proper spacing of nodes composed of dissimilar metals or other materials. This spacing may ensure that the two subcomponents being joined are not in physical contact so that galvanic corrosion can be avoided. The spacing insulates the nodes/subcomponents. In some embodiments, sealants, in addition to providing seals, may act as spacers as well. In other embodiments lacking corrosion concerns due to the application of coatings or other treatment methods, such as e-coat, on the nodes, the node-node joint sections 200a and 200b may be flush against each other such that no gap is present and not require sealants. Each of node-node joint sections 200a and 200b may include a side wall 210 in the interior of node-node joint 200.

Node to node joint 200 may further include inlet port 204 to enable entry of an adhesive into the node-node joint 200 and vacuum port 206 for drawing a vacuum to facilitate the flow of adhesive within node-node joint 200. In the embodiment shown, respective inlet and vacuum ports 204 and 206 are built within node 200b and designed to provide a flow of adhesive to assist in adjoining nodes 200a and 200b as described below. In other embodiments, adhesive may be directly deposited into the node-node joint 200 prior to curing to realize a structural connection between the two subcomponents.

Figure 3:
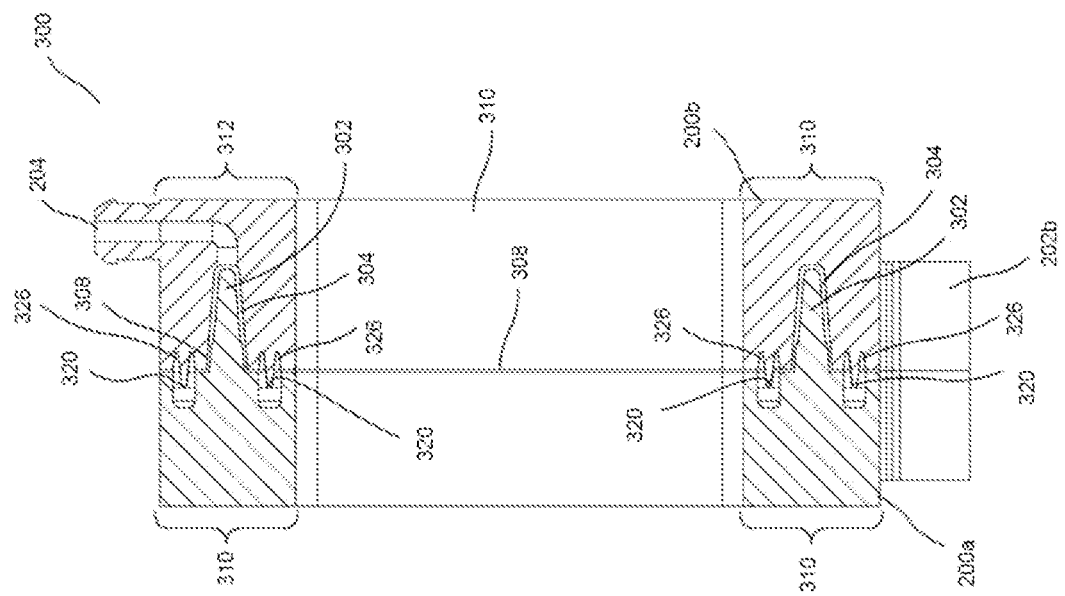
FIG. 3 shows a cross-sectional view illustrating the node-node joint of FIG. 1, in accordance with various aspects of the present disclosure.

FIG. 3 shows a cross-sectional view illustrating the node-node joint of FIG. 2.

FIG. 3 illustrates a cross-sectional view of the node-node joint 200 taken along plane A-A-A-A. In this view, side wall 210 of FIG. 3 corresponds to side wall 210 of FIG. 2, and standoff tab 202b of FIG. 3 corresponds to standoff tab 202b of FIG. 2. Shown on side wall 210 of FIG. 2 is gap 208. The tongue portion 302 of the node-node joint 300 is part of node 200A, includes a first material represented by the diagonal lines of node 200A, and is disposed along a generally peripheral region 310 of the node 200A. In one embodiment, the tongue portion 302 extends all the way around the peripheral region 310 and is in effect a single protrusion disposed around the peripheral region 310. The tongue portion 302 protrudes outward along the peripheral region 310 relative to node 200B and around node 200A, and the lateral extension of tongue portion 302 can be considered in this view as coming out of the figure. The groove portion 304 of the node-node joint 300 is part of node 200B and is disposed along a generally peripheral region 312 of the node 200b. The groove portion 304 may, but need not, be composed of the material of node 200b, wherein the material is represented by the diagonal lines in node 200b that run in a direction opposite the diagonal lines of node 200a. In one embodiment, the groove portion 304 extends all the way around the peripheral region 312 and is in effect a single indentation in the node 200b all the way around peripheral region 312. The groove portion 302 is inset inward along the peripheral region 312 relative to node 300a and runs laterally around node 300b and can also be considered in this view as coming out of the figure. Tongue 302 and groove 304 may be arranged on respective nodes 200a and 200b such that when the two nodes are properly placed into contact, tongue 302 may align with groove 304 and may fit into groove 304 around the peripheral regions 310, 312.

In an exemplary embodiment, groove 304 includes centering feature 308 which is a narrow region that widens the opening of groove 302 and assists in enabling tongue 302 to properly mate with groove 304 to thereby center the node-node joint 300. In another exemplary embodiment, spill-off sealant reservoirs 326 are provided on each side of the tongue 302, each reservoir 326 having sealant grooves 320 that may be used for the application of an appropriate sealant, e.g., to control the flow of an adhesive to be applied.

As shown relative to FIGS. 2 and 3, adhesive and vacuum ports 204 and 206 are respectively provided. In one embodiment, a sealant is first applied at the sealant grooves 320 of node 200a. The two nodes 200a and 200b may then be aligned and fixed securely in place using standoff tabs 202a-c as alignment points. A vacuum may be applied at vacuum port 206 to ensure that the nodes are sealed. Once a complete seal has been obtained, an adhesive may be applied through inlet port 204. In one embodiment, the internal structure of vacuum port 206 is similar to that of inlet port 204. The adhesive-vacuum action causes the adhesive to seep into the space between the tongue 302 and the groove 304 and to flow in this space around the peripheral region 310, 312 until the adhesive has properly saturated the tongue grove connection around the peripheral region.

In an embodiment, the standoff tabs 220a-c may also be used to assist in preventing sealant pushback during the adhesive flow and curing process. Once the adhesive fills the gap between the tongue 302 and the groove 304 sections substantially completely, the adhesive may be allowed to cure. The vacuum pressure during the adhesive flow process may be monitored and may be indicative of a complete adhesive fill. On completion of the cure, the standoff tabs may in one embodiment be broken off.

Using this technique, nodes can be efficiently and durably combined. The use of AM in one embodiment creates the structure necessary for implementing the joining of the nodes such that additional processes beyond application of an adhesive and/or sealant, such as welding or the use of various external fastening mechanisms, are not necessary.

In another aspect of the disclosure, techniques for joining subcomponents of a larger additively manufactured component, such as an engine, transmission, gear case, etc., are disclosed. In the discussion that follows, the present disclosure will be illustrated in the context of an additively manufactured gear case within the transmission of a transport structure. It will be appreciated, however, that the teachings of the present disclosure are not so limited, and any number and types of additively manufactured components may be assembled using the principles describe herein.

Figure 4:
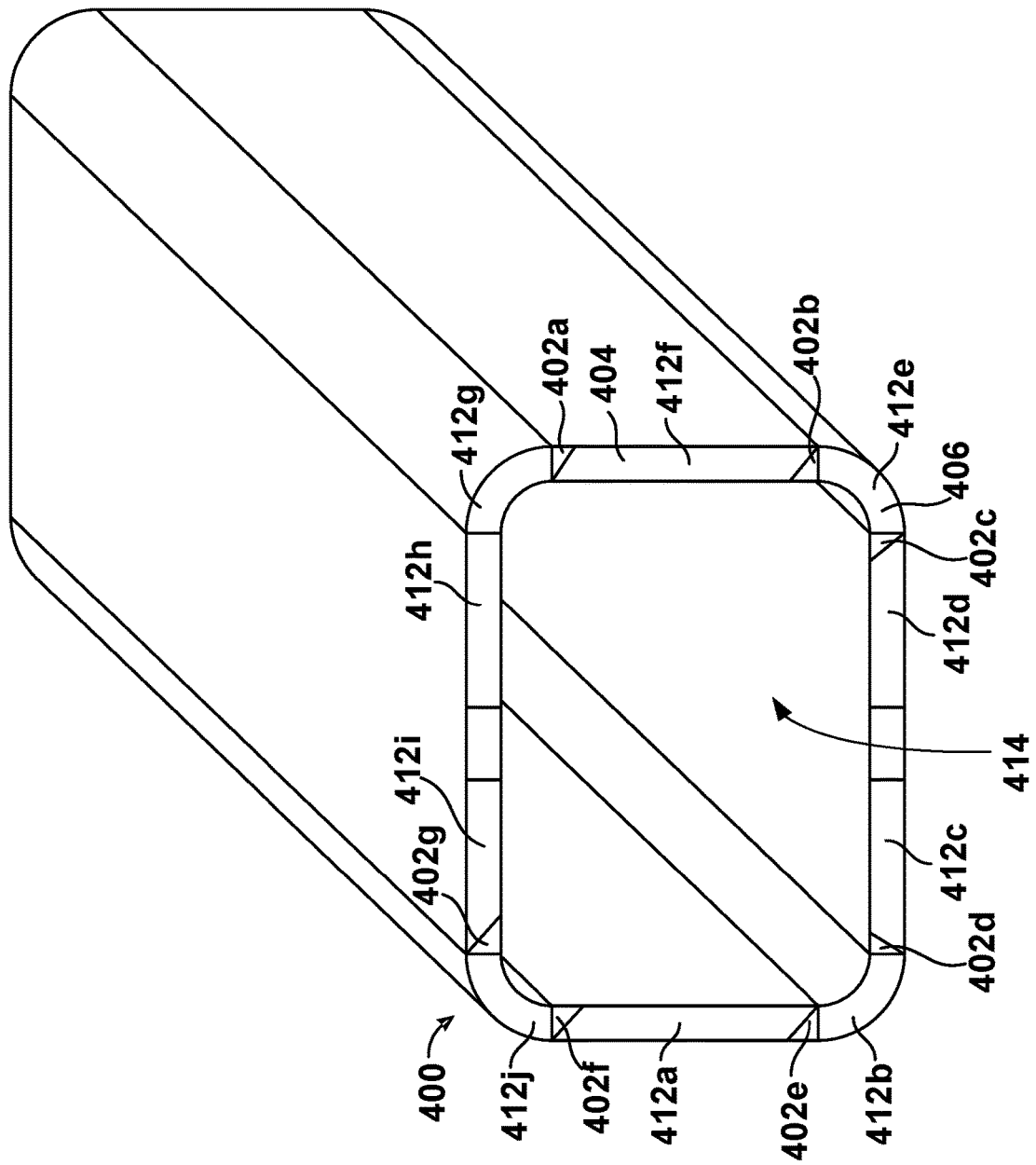
FIG. 4 illustrates a perspective cross-sectional view of a node, in accordance with various aspects of the present disclosure.

FIG. 4 illustrates a perspective cross-section view of a node, in accordance with various aspects of the present disclosure.

FIG. 4 illustrates a cross-section view of a node 400. Node 400 may be similarly configured as nodes 200a, 200b of FIG. 2. The node 400 may be a primary structure and/or a part of a primary structure configured to receive safety and operational loads of a vehicle. Examples of node 400 may include crash structure, chassis, a portion of a chassis, fuselage, occupant safety cell, a portion of an occupant safety cell, payload storage, and the like. While not shown in FIG. 4, node 400 may include one or more inlet ports and one or more vacuum ports.

Node 400 may include various sections 412a, 412b, 412c, 412d, 412e, 412f, 412g, 412h, 412i, 412j, around a peripheral portion of node 400, and collectively referred to herein as peripheral sections 412. In some implementations, a peripheral portion of the node 400 may be divided into the peripheral sections 412 as shown in FIG. 4. Each of the peripheral sections 412 may include a cavity and be configured to receive various types of material including but not limited to adhesive material, conductive polymer.

In some implementations, a subset of the peripheral sections 412 may be configured to receive structural adhesive material 404 and another subset of the peripheral sections 412 may be configured to receive conductive material 406. For example, as shown in FIG. 4, peripheral sections 412a, 412c, 412d, 412f, 412h, and 412i receive structural adhesive material 404, and peripheral sections 412b, 412e, 412g, 412j receive conductive material 406. The structural adhesive material 404 and conductive material 406 may be injected into the peripheral sections 412 during an assembly process using the node 400 and/or assembly of the node 400. In some implementations conductive material 406 may be a conductive polymer.

The peripheral portion of the node 400 may include one or more joints, such as joints 402a, 402b, 402c, 402d, 402e, 402f, 402g, collectively referred to herein as multifunction joints 402. In some implementations, one or more of the multifunction joints 402 may include a cavity (not shown separately), where the cavity may be adapted to hold one or more connectors (not shown separately). In some implementations, as described herein a "connector" may be an interconnect, coupler, or other device for coupling a component (e.g., node 400) with another component (e.g., another node). In some implementations, the connectors may include a groove, a cup, a channel, a furrow, and or other indentation. In some connectors may include a tongue, a cone, an extrusion, and/or other extensions.

Node 400 may be configured with cavity 414, as shown in FIG. 4. The cavity 414 may be configured to receive energy storage modules (not shown in FIG. 4). The node 400 may be co-printed with an electrical conductive path, such as a bus bar. The electrical conductive path may be configured to connect the energy storage module received in the node with other electrical components of a vehicle. Additional details of the electrical conductive path and/or bus bar are described herein with respect to FIGS. 5-9.

Figure 5A:
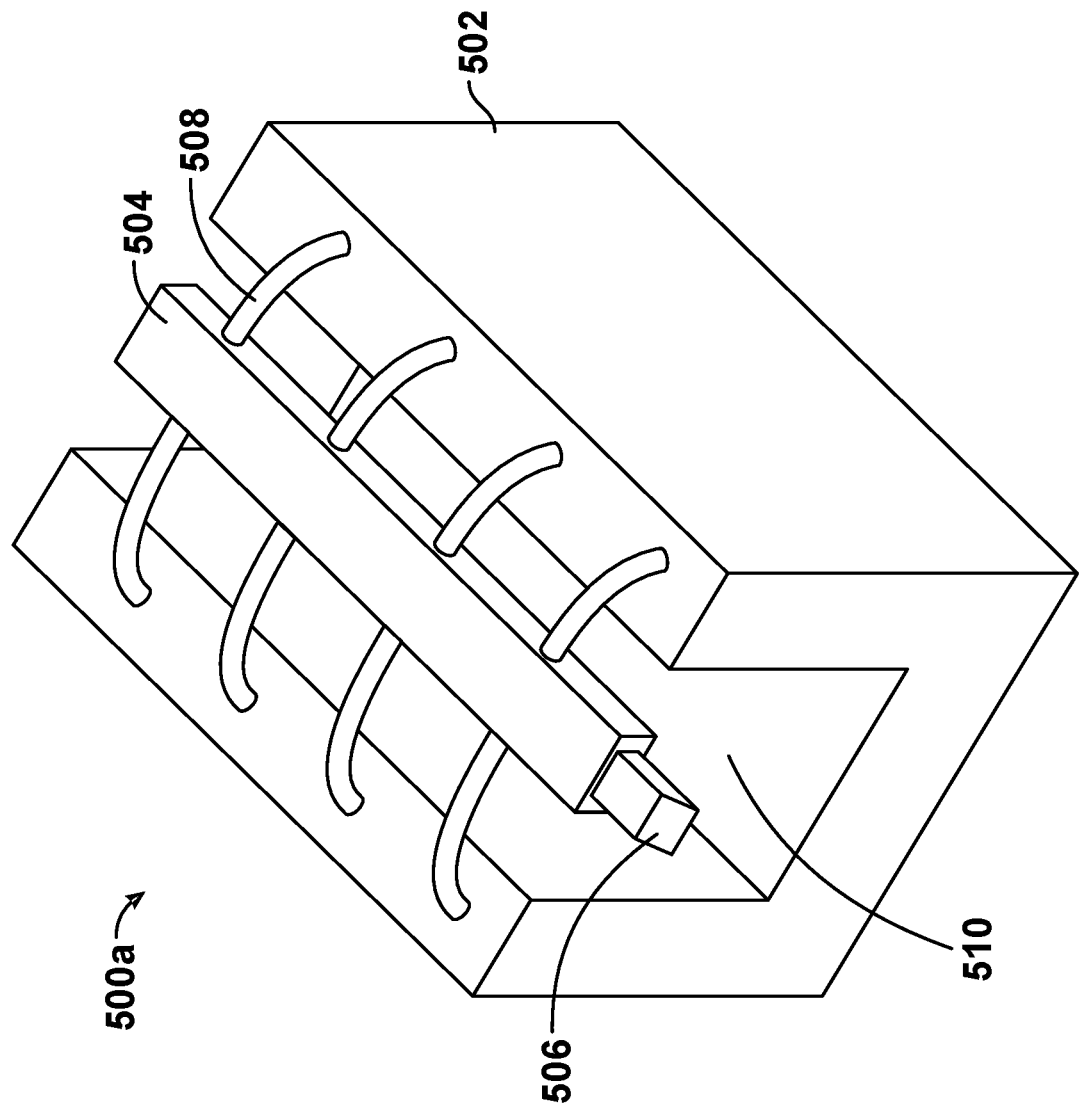
FIGS. 5A-5B illustrates a perspective view of a node with co-printed bus bas, in accordance with various aspects of the present disclosure.

Turning now to FIG. 5A, there is shown a perspective view 500a of a node with co-printed electrical conductive path (e.g., bus bar), in accordance with various aspects of the present disclosure. For the purpose of illustrating a clear example, only a portion of the node 502 is illustrated in FIG. 5A. In FIG. 5A, the node 502 may be co-printed with bus bar 504. The bus bar 504 may be an electrical conductive path that connects an energy storage module (not shown in FIG. 5A) with the other electrical components of a vehicle. In some implementations, the bus bar 504 may include one or more electrical connections and the like.

In some implementations, the bus bar 504 may be co-printed with the node 502, by co-printing supports 308 as shown in FIG. 5A. Each of the supports 508 is co-printed to connect a portion of the bus bar 504 with the portion of the node 502. The supports 508 may be removed during an assembly process of assembling the node 502 with other nodes, components, structures, and the like of the vehicle. For example, the supports 508 may be removed by machining away the supports 508. The supports 508 may, in certain embodiments, be co-printed with printing parameters that make it structurally weaker than the bus bar 504 and/or node 502. In other embodiments, the supports 508 may be removed using a chemical process.

The node 502 includes a cavity 510 configured to receive an energy storage module (not shown in FIG. 5A). The bus bar 504 may be electrically connected to the energy storage module. Additional details of the bus bar electrically connected to the energy storage modules in described herein with respect to FIGS. 6-9. In some implementations, the supports 508 may be removed and/or machined when the cavity 510 receives the energy storage module and/or when the bus bar 504 is electrically connected with the energy storage modules.

The bus bar 504 may be electrically insulated from other components of the node 502 and/or other components of the vehicle. For example, an injectable insulator may be extruded and/or otherwise applied on a surface of the bus bar 504 and/or the energy storage device. In some implementations, an electro coating of metallic substrates with dielectric solution may be applied to the bus bar 504 and/or energy storage device. In some implementations, a curable insulation may be extruded on and/or otherwise applied to metallic substrates and cured in-place. For example, an ultraviolet (UV) cured insulating material may be applied to a metallic substrate (e.g., metallic substrate of the bus bar 504, metallic substrate of the energy storage module, and the like) and cured in-place with UV light. In some implementations, thermoplastics may be applied, printed and/or co-printed onto metallic substrates.

The bus bar 504 may include an indentation and/or an extension that is configured to connect with another bus bar. For example, as shown in FIG. 5A, the bus bar 504 includes tongue 506. The tongue 506 may be configured to extend into an indentation, such as a groove, of another bus bar. As shown in FIG. 5A, the tongue 506 is included at one end of the bus bar 504. While not shown in FIG. 5A, in some implementations, at the other end of the bus bar 504 may include an indentation, such as a groove, a cup, a channel, a furrow, and or other indentation. In some implementations, the other end of the bus bar 504 may include another extension, such as a tongue, a cone, an extrusion, and/or other extensions.

Figure 5B:
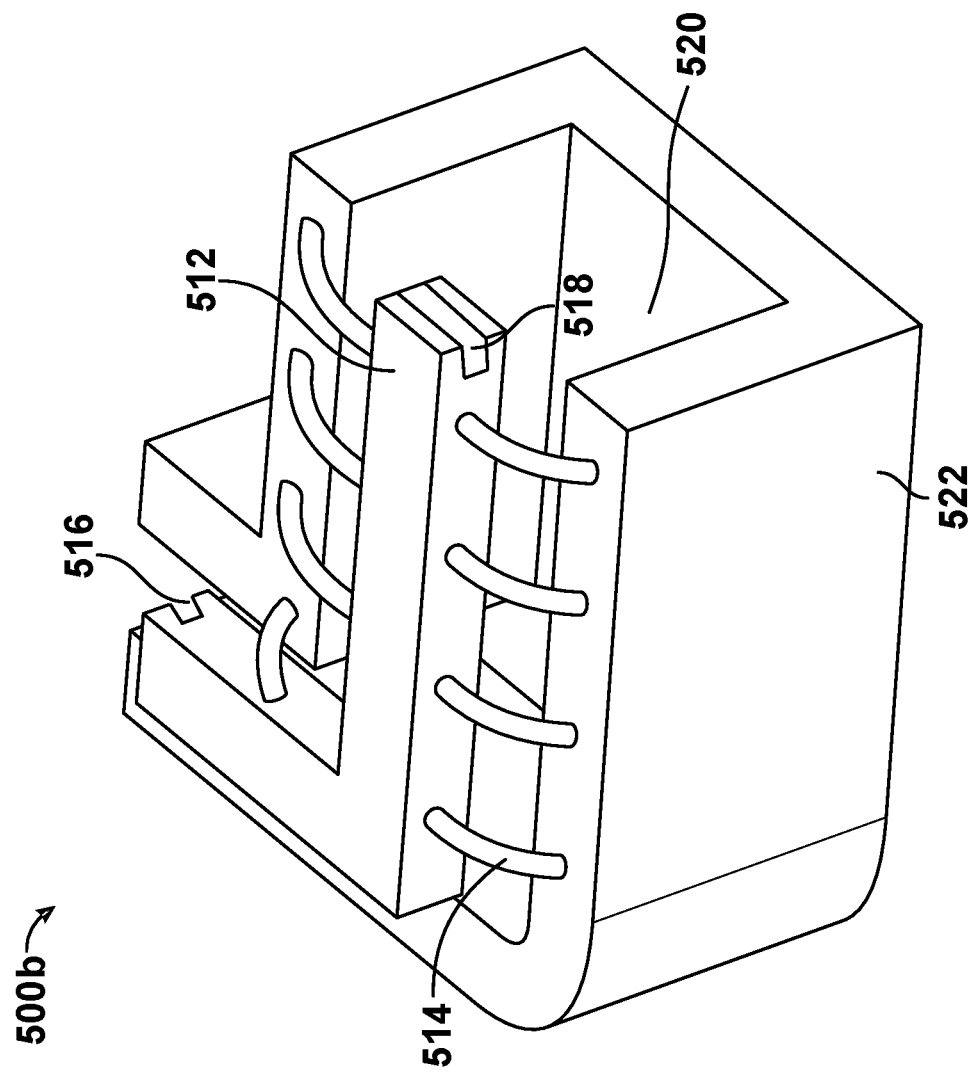

Turning now to FIG. 5B, there is shown another example of a bus bar 512 co-printed with the node 522. Bus bars 512 and node 522 may be configured similarly to bus bar 504 and node 502. Supports 514 may be co-printed similarly as described in FIG. 5A, and may be removed and/or machined away in a similar manner the remove and/or machining away of supports 508 as described above with respect to FIG. 5A.

Similar to node 502, node 522 includes a cavity 520 that may be configured to receive an energy storage module and/or a portion of another energy storage module (e.g., a portion of the energy storage module received in node 502). The bus bar 512 may be electrically connected to the energy storage module received in the node 522. The bus bar 512 may be include an indentation, such as, a cup, a channel, a furrow, and or other indentation. For example, the bus bar 512 may include a groove 518 at one end of the bus bar 512. In some implementations, the bus bar 512 may include another indentation, such as, a cup, a channel, a furrow, and or other indentations at the other end of the bus bar 512. For example, the bus bar 512 may include a groove 516 at one end of the bus bar 512. In some implementations, the bus bar 512 may include an extension, such as a tongue, a cone, an extrusion, and/or other extensions.

The bus bar 504 and the bus bar 512 may connect with each other via the tongue 506 of the bus bar 504 and the groove 516 of bus bar 512. In some implementations, the tongue 506 and the groove 516 may be configured to mate with each other. For example the groove 516 may be configured to receive the tongue 506. An injectable conductor may be inserted and/or injected between the extensions (e.g., extension 506) and the indentations (e.g., groove 516). Additional details of the injecting a conductor is described herein with respect to FIG. 6.

Figure 6:
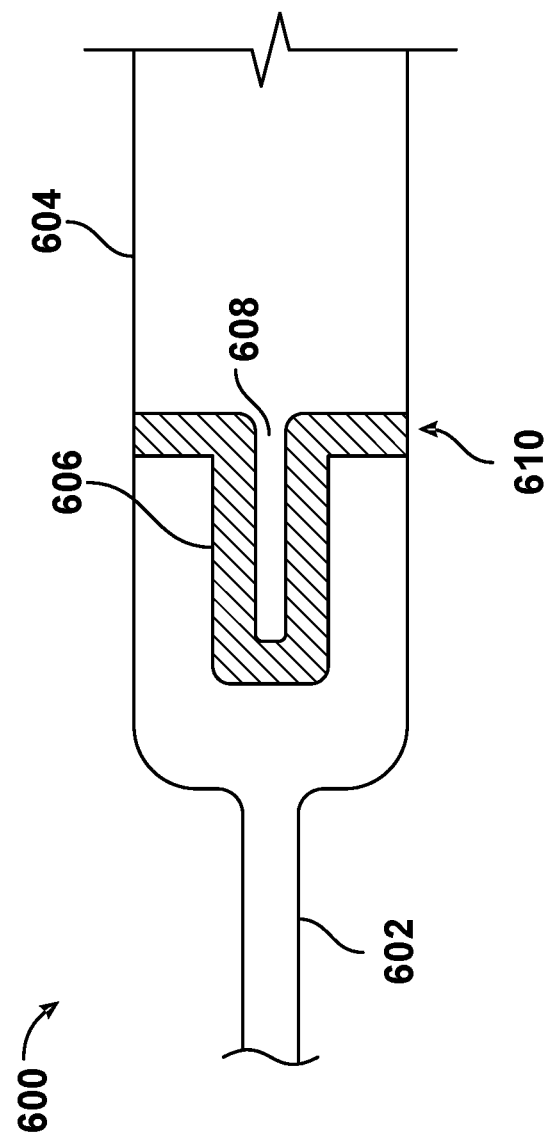
FIG. 6 illustrates a cross-sectional view illustrating bus bar to bus bar joint, in accordance with various aspects of the present disclosure.

Turning now to FIG. 6, there is shown a bus bar 602 with a groove 606 and a bus bar 604 with a tongue 608. The bus bar 602 and the bus bar 604 are connected with each other. The bus bars 602 and 604 may be connected with energy storage module(s). As shown in FIG. 6, the tongue 608 may be configured to be mated with the groove 604. Injectable conductor 610 may be provided and/or injected into the groove 606. The injectable conductor 610 may allow for electrical conductive path to continue between the bus bars 602 and 604 and between the energy storage modules of to which the bus bars 602 and 604 are electrically connected.

In some implementations, two bus bars (e.g., bus bars 602 and 604) may be connected with each other via fastening components, such as a screw fasteners, rivets, ultrasonic welding, fusion welding, and the like. In some implementations, two bus bars may be connected with other via mechanical fasteners (e.g., self-taping screws, flow drills, and the like) that expose a conductor to allow the electrical connection to continue between the two bus bars.

In some implementations, curable conductive materials can be used for electrical connections between the bus bars and the energy storage modules. The curable conductive material may be cured during a heat cycle. In some embodiments, the curable conductive material may be cured either before, during, or after the curing of the structural adhesive between node-based subcomponents that incorporate the bus bars as described herein.

Figure 7:
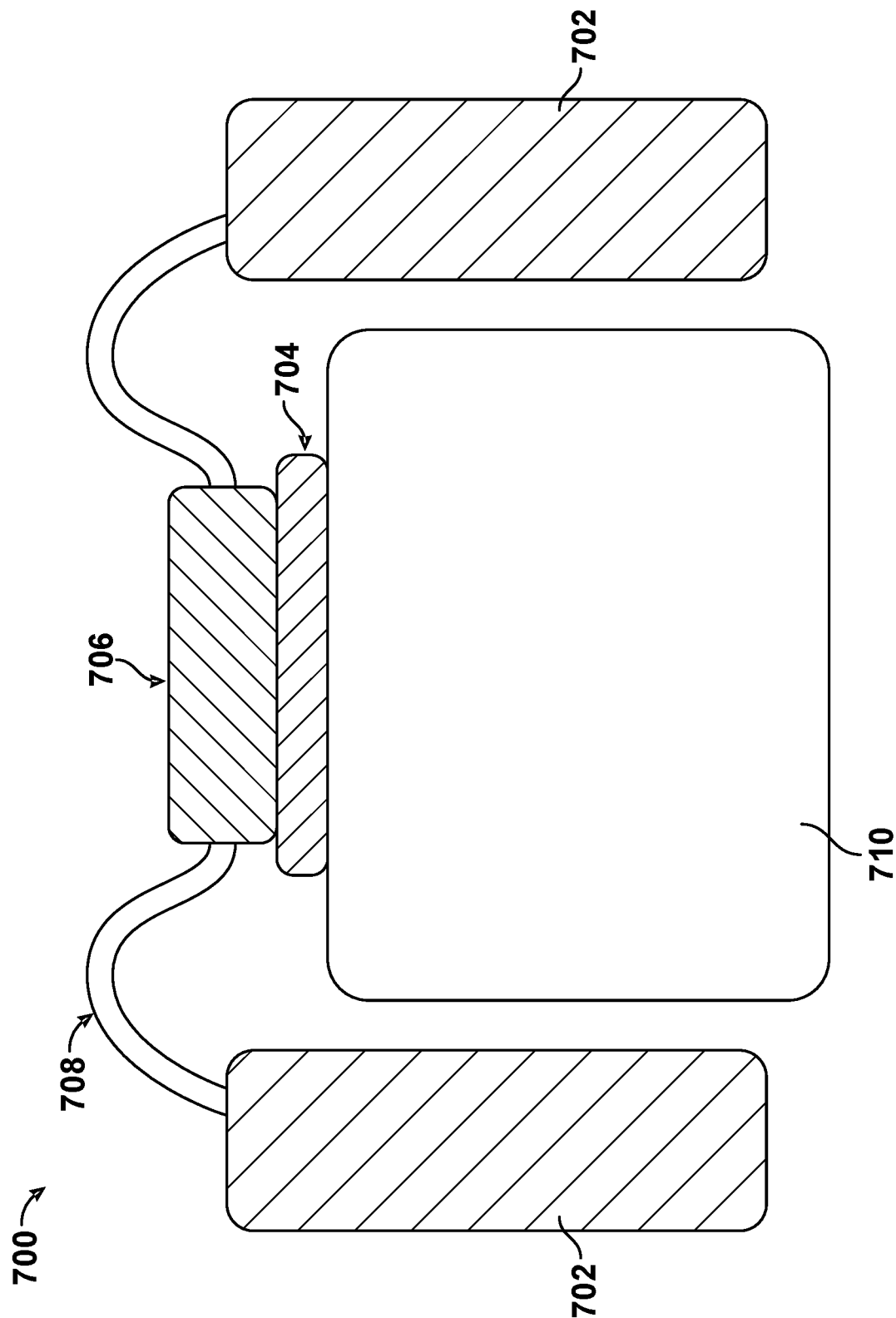
FIG. 7 illustrates a cross-sectional view of a co-printed bus bar connected with an energy storage module in a node, in accordance with various aspects of the present disclosure.

Turning now to FIG. 7, there is shown a cross-sectional view of a co-printed bus bar connected with an energy storage module in a node, in accordance with various aspects of the present disclosure.

In FIG. 7, node 702 includes an energy storage module 710, and a bus bar 706 is co-printed with node 702 with the supports 708. In this embodiment, the node 702 may be the primary structure of the vehicle (e.g., chassis, subframes, frames, etc.). The supports 708 may be removed and/or machined away after connection of the bus bar 706 with the energy storage module 710. The bus bar 706 is electrically connected with energy storage module 710. As described above, the bus bar 706 may be electrically insulated from other components. As shown in FIG. 7, insulator 704 may be applied to a surface of bus bar 706. The insulator 704 may be an injectable insulator 704. In FIG. 7, while the insulator 704 is applied between bus bar 706 and the energy storage module 710. However, the insulator 704 does not interfere with the electrical connections between bus bar 706 and energy storage module 710.

Figure 8:
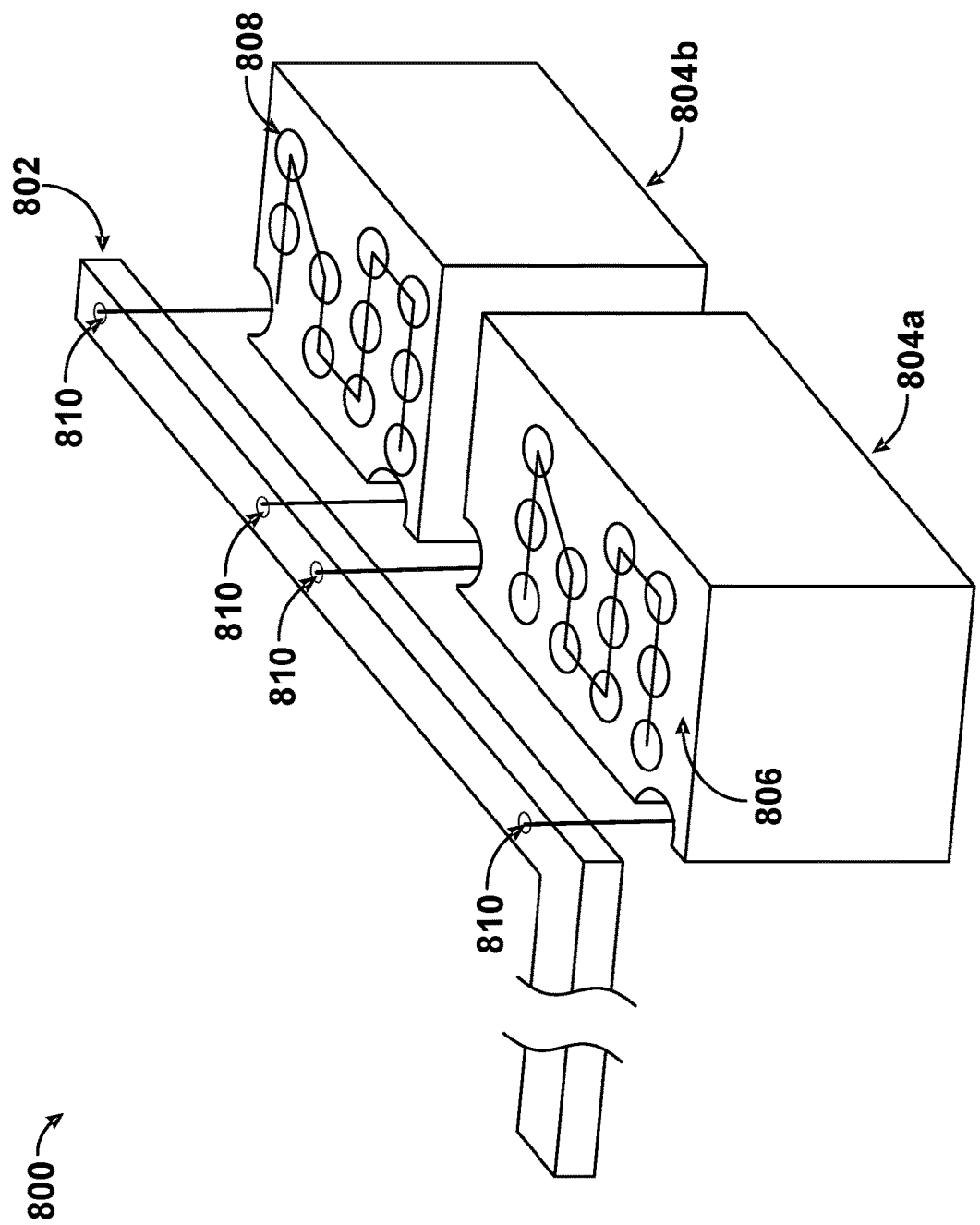
FIG. 8 illustrates a perspective view of bus bars connected with energy storage modules, in accordance with various aspects of the present disclosure.

Turning now to FIG. 8, there is shown a perspective view of a bus bar connected with energy storage modules, in accordance with various aspects of the present disclosure.

In FIG. 8, bus bar 802 is electrically connected with energy storage modules 804a and 804b. While the bus bar 802 is depicted as a single bus bar in FIG. 8, in some implementations, the bus bar 802 may be formed by connecting multiple bus bars as described above with respect to FIGS. 5-6.

Each of the energy storage modules 804a and 804b may include one or more energy storage cells, such as energy storage cells 808. In some implementations, each of the energy storage cells 808 may be electrically connected with other energy storage cells 808 of an energy storage module. To provide electric insulation between the energy storage modules and other components of the node, and/or the vehicle, each energy storage module 804a, and 804b may be insulated, for example, by dielectric insulation.

The bus bar 802 may be electrically connected to the energy storage modules 804a, 804b via the electrical connections 810. Examples of electrical connections 810 may comprise various electrical conductive paths including, but are not limited, to electrical links, wires, and/or other electrical conductive materials. The bus bar 802 may be co-printed with a node similar to the techniques described above with respect to FIGS. 5-7. The energy storage modules 804a, 804b may either be included in the node, co-printed with the bus bar 802.

Figure 9:
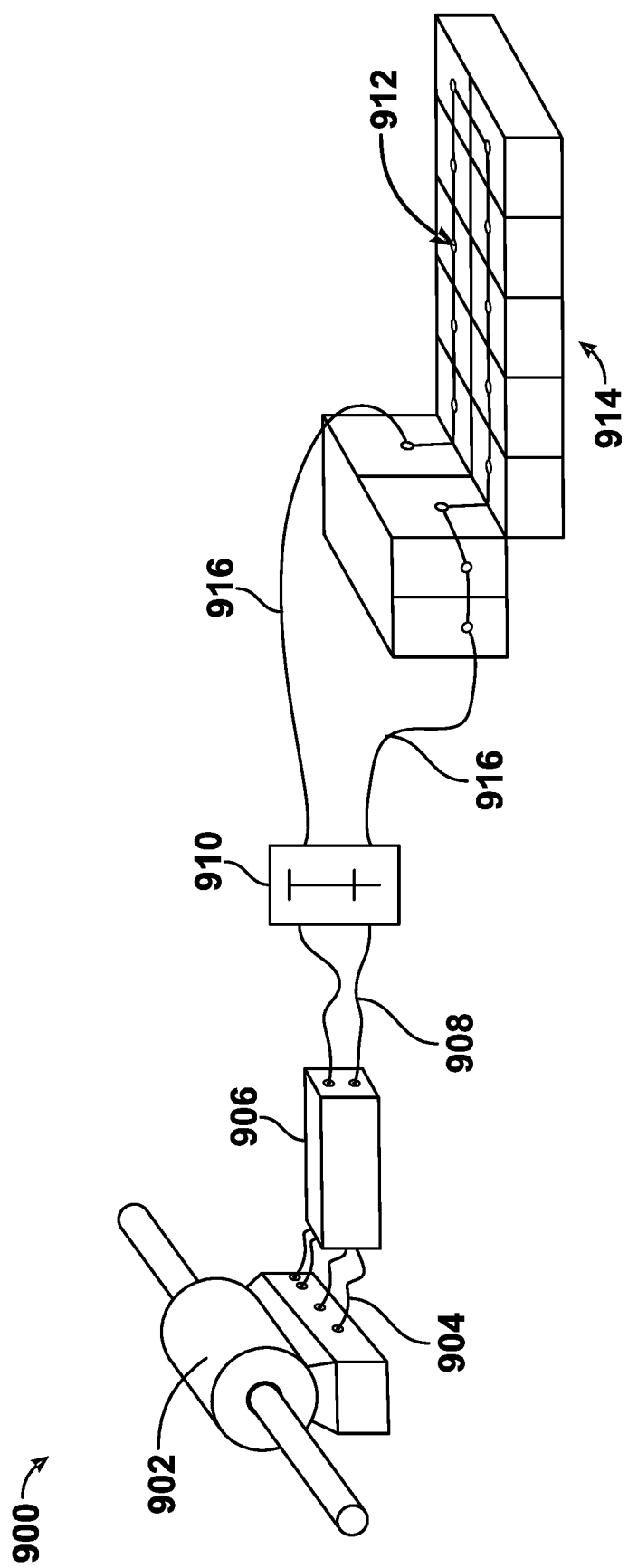
FIG. 9 illustrates bus bars connected with energy storage modules and other components of a vehicle, in accordance with various aspects of the present disclosure.

Turning now to FIG. 9, there is shown bus bars connected with energy storage modules and other components of a vehicle, in accordance with various aspects of the present disclosure.

In FIG. 9, there is shown a motor 902 (e.g., electric motor) electrically connected to an inverter 906 via electrical link 904. In some implementations, the electrical link 904 may be a direct current (DC) link. The inverter 906 maybe electrically connected to a contactor 910 via electrical link 908. The electrical link 908 may be a DC link.

The bus bars 912 are electrically connected to the contactor 910 via electrical links 916. The bus bars 912 are electrically connected to the energy storage modules 914. Therefore, the bus bars 912 connect the energy storage modules 914 with the other components shown in FIG. 9. For example by being electrically connected with the energy storage modules 914, the bus bars 912 connect the energy storage modules 914 to the motor 902 via the electrical links 916, contactor 910, DC link 908, inverter 906, and DC link 904.

While not shown in FIG. 9, the bus bars 912 and energy storage modules 914 may be included within different nodes as described herein. The bus bars 912 may be co-printed with nodes.

The techniques of co-printing of the bus bars with the nodes and joining of nodes and/or bus bars as described herein allow for bus bars to be manufactured for any shape of a node. The bus bars described herein may be manufactured using materials with low density and high stiffness (e.g., light alloys) to achieve a low or the lowest possible mass structure. In some embodiments, the structural portions, i.e., the nodes, and the bus bars may be printed with the same material. Parameters may be adjusted during the 3D printing process to effect electrical properties (e.g., increased resistivity, conductivity, etc.). In alternate embodiments, a multi-material printing process may be used wherein the structural portions, i.e., the nodes, may be printed with aluminum or alloys thereof, while the bus bars may be printed with copper.

The bus bars and the nodes may be manufactured using the same base material, and by co-printing the bus bars and the nodes, the mass of the structure and/or the total mass of the vehicle may be optimized. Furthermore, co-printing the bus bars and the nodes allows for further design optimization as it allows for complex structures to be realized.

Turning now to FIG. 10, there is shown a flow diagram 1000 illustrating an exemplary method for co-printing conductive paths (e.g., electrical conductive paths, bus bars, and the like) for printed structural energy storage modules in accordance with various aspects of the present disclosure. It should be understood that the steps identified in FIG. 10 are exemplary in nature, and a different order or sequence of steps, and additional or alternative steps, may be undertaken as contemplated in this disclosure to arrive at a similar result.

At step 1002, a first component (e.g., nodes 200a, 200b, 400, 502, 522) may be additively manufactured (e.g., using one or more AM and/or three-dimensionally (3D) print processes described herein), such that the first component is configured to be a primary structure of the vehicle. The first component may be co-printed with a first electrical conductive path (e.g., 504, 512). The first electrical conductive path may be configured to be connected to a second electrical conductive path (e.g., 512, 504) of a second component (e.g., nodes 200a, 200b, 400, 502, 522) of the vehicle.

At optional step 1004, an electrical insulator may be injected between the first conductive path and the first component.

In some implementations, the first electrical conductive path is configured to be connected to the second electrical conductive path through an injectable conductor (e.g., injectable conductor 610). In some implementations, the first component comprises at least a tongue structure (e.g., tongue portion 302) configured to mate with a corresponding groove structure (e.g., grooves 304, 320) of the second component. The first electrical conductive path (e.g., 504, 512) may pass through a portion of the tongue structure of the first component, or a groove structure configured to mate with a corresponding tongue structure of the second component. The second electrical conductive path (e.g., 512, 504) may pass through a portion of the tongue structure of the second component.

In some implementations, the first component is co-printed with a first set of supports (e.g., 508, 514), each support of the first set of supports is connected to a portion of the first electrical conductive path. In some implementations, the first component is configured to receive at least a portion of a first energy storage module (e.g., 710). In some implementations, the first electrical conductive path (e.g., 802) is configured to be connected (e.g., connections 810) to the first energy storage module (e.g., 804a, 804b). In some implementations, the first electrical conductive path comprises a bus bar.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for printing and joining nodes and subcomponents. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus, comprising:
a first component configured to be a primary structure of a vehicle, the first component co-printed with a first electrical conductive path, the first electrical conductive path configured to be connected to a second electrical conductive path of a second component of the vehicle,
wherein the first electrical conductive path and the second electrical conductive path are configured to enable electricity transmission,
wherein the first component comprises at least a tongue structure configured to mate with a corresponding groove structure of the second component,
wherein the first electrical conductive path passes through a portion of the tongue structure of the first component, or a groove structure configured to mate with a corresponding tongue structure of the second component,
wherein the second electrical conductive path passes through a portion of the tongue structure of the second component, and
wherein the first electrical conductive path is configured to be connected to the second electrical conductive path via an injectable conductor injected into the groove structure.

2. The apparatus of claim 1, wherein the first component is co-printed with a first set of supports, each support of the first set of supports is connected to a portion of the first electrical conductive path.

3. The apparatus of claim 1, wherein the first component is configured to receive at least a portion of a first energy storage module.

4. The apparatus of claim 3, wherein the first electrical conductive path is configured to be connected to the first energy storage module.

5. The apparatus of claim 1, further comprising:
an electrical insulator between the first electrical conductive path and the first component.

6. The apparatus of claim 1, wherein the first electrical conductive path comprises a bus bar.

7. A method comprising:
additively manufacturing a first component configured to be a primary structure of a vehicle, wherein the first component is co-printed with a first electrical conductive path, the first electrical conductive path configured to be connected to a second electrical conductive path of a second component of the vehicle,
wherein the first electrical conductive path and the second electrical conductive path are configured to enable electricity transmission,
wherein the first component comprises at least a tongue structure configured to mate with a corresponding groove structure of the second component,
wherein the first electrical conductive path passes through a portion of the tongue structure of the first component, or a groove structure configured to mate with a corresponding tongue structure of the second component,
wherein the second electrical conductive path passes through a portion of the tongue structure of the second component, and
wherein the first electrical conductive path is configured to be connected to the second electrical conductive path via an injectable conductor injected into the groove structure.

8. The method of claim 7, wherein the first component is co-printed with a first set of supports, each support of the first set of supports is connected to a portion of the first electrical conductive path.

9. The method of claim 7, wherein the first component is configured to receive at least a portion of a first energy storage module.

10. The method of claim 9, wherein the first electrical conductive path is configured to be connected to the first energy storage module.

11. The method of claim 7, further comprising:
injecting an electrical insulator between the first electrical conductive path and the first component.

12. The method of claim 7, wherein the first electrical conductive path comprises a bus bar.

13. A non-transitory computer-readable medium storing computer executable code, the code when executed by a processor causing the processor to:
additively manufacture, via a 3-D printer system, a first component configured to be a primary structure of a vehicle, wherein the first component is co-printed with a first electrical conductive path, the first electrical conductive path configured to be connected to a second electrical conductive path of a second component of the vehicle,
wherein the first electrical conductive path and the second electrical conductive path are configured to enable electricity transmission, wherein the first component comprises at least a tongue structure configured to mate with a corresponding groove structure of the second component, wherein the first electrical conductive path passes through a portion of the tongue structure of the first component, or a groove structure configured to mate with a corresponding tongue structure of the second component, wherein the second electrical conductive path passes through a portion of the tongue structure of the second component, and wherein the first electrical conductive path is configured to be connected to the second electrical conductive path via an injectable conductor injected into the groove structure.

14. The non-transitory computer-readable medium of claim 13, wherein the first component is co-printed with a first set of supports, each support of the first set of supports is connected to a portion of the first electrical conductive path.

15. The non-transitory computer-readable medium of claim 13, wherein the first component is configured to receive at least a portion of a first energy storage module.

16. The non-transitory computer-readable medium of claim 15, wherein the first electrical conductive path is configured to be connected to the first energy storage module.

17. The non-transitory computer-readable medium storing computer executable code of claim 13, the code when executed by a processor further causes the processor to:

inject an electrical insulator between the first electrical conductive path and the first component.

18. The non-transitory computer-readable medium of claim 13, wherein the first electrical conductive path comprises a bus bar.

* * * * *